United States Patent [19]

Havenstein et al.

[11] Patent Number: 4,898,740
[45] Date of Patent: Feb. 6, 1990

[54] PACKAGE CONTAINING A WATER-IN-OIL FAT DISPERSION

[75] Inventors: Alfred G. Havenstein, Schenefeld; Werner Kahle, Pinneberg; Dagmar Schnell, Hamburg, all of Fed. Rep. of Germany

[73] Assignee: Lever Brothers Company, New York, N.Y.

[21] Appl. No.: 130,384

[22] PCT Filed: Apr. 3, 1987

[86] PCT No.: PCT/EP87/00188
§ 371 Date: Dec. 1, 1987
§ 102(e) Date: Dec. 1, 1987

[87] PCT Pub. No.: WO87/05886
PCT Pub. Date: Oct. 8, 1987

[30] Foreign Application Priority Data

Apr. 4, 1986 [DE] Fed. Rep. of Germany ....... 3611276

[51] Int. Cl.$^4$ ............ A23D 3/04; A23D 5/04
[52] U.S. Cl. .................. 426/106; 426/89; 426/90; 426/316; 426/324
[58] Field of Search ............ 426/106, 324, 277, 320, 426/603, 89, 316, 90

[56] References Cited

U.S. PATENT DOCUMENTS

| 1,587,414 | 6/1926 | Pond. | |
|---|---|---|---|
| 2,635,049 | 4/1953 | Eldredge | 426/130 |
| 2,982,658 | 5/1961 | Naidus et al. | 99/166 |
| 3,597,229 | 8/1971 | Mijnders et al. | 426/603 |
| 3,956,522 | 5/1976 | Kattenburg et al | 426/603 |
| 4,087,565 | 5/1978 | Esskamp | 426/603 |
| 4,247,563 | 1/1981 | Sample | 426/106 |

FOREIGN PATENT DOCUMENTS

| 668727 | 2/1966 | Belgium. |
| 1445240 | 12/1966 | France. |
| 2307726 | 11/1976 | France. |
| 854067 | 11/1960 | United Kingdom. |

Primary Examiner—Steve Alvo
Attorney, Agent, or Firm—Milton L. Honig

[57] ABSTRACT

A package containing margarine or a similar spread (3), at least the surface of which that is not in contact with the walls of the package being provided with a thin coating formed by a substantially pore-free, edible fat layer (6) which does not contain a discontinuous aqueous phase, is not separately perceptible to the average consumer without auxiliary means and may contain a non-aqueous, physiologically acceptable filling agent, such as gas, dispersed therein. This package decreases, among other things, the risk of mould formation and discoloration on the free surface of the spread contained therein.

6 Claims, 1 Drawing Sheet

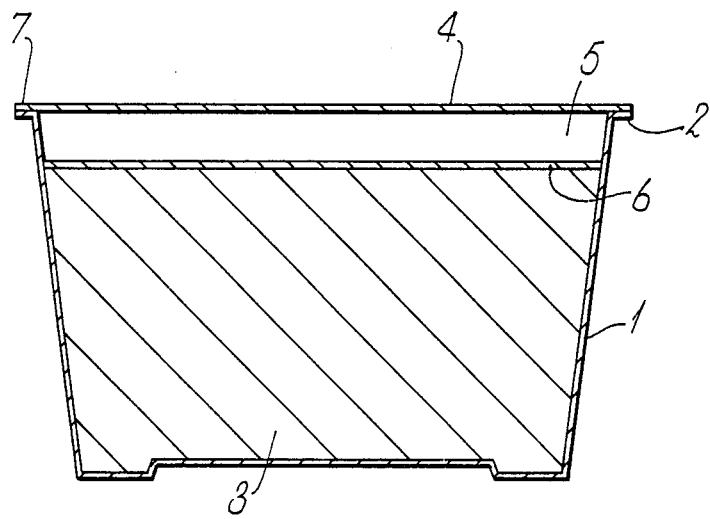

PACKAGE CONTAINING A WATER-IN-OIL FAT DISPERSION

FIELD OF THE INVENTION

The present invention relates to a package containing a water-in-oil (W/O) dispersion such as a margarine or a similar spread, at least a surface of which that is not in contact with the walls of the package being provided with a thin coating. Although the present invention will be set forth with particular reference to margarines, it should be understood that the invention extends inter alia to those embodiments, in which margarine is replaced by a different edible fat composition.

BACKGROUND OF THE INVENTION

Nowadays, margarines and similar products are marketed packaged in several manners. Three different types of package are commonplace: a tub-shaped container, the lid of which is in contact with the surface of the product, a tub-shaped container having a so-called headspace between the upper surface of the product and the lid, and a wrapper closed by folding, which encloses a block-shaped product.

The above-mentioned packages or manners of packaging have drawbacks. On removal of the lid that is in direct contact with the surface of the margarine, the surface of the margarine, but also the opened lid and mostly the edge of the tub look greasy. After a few weeks' storage, a dark yellow discolouration forms at the places where air enters. When a headspace is present between the surface of the margarine and the lid, there is a risk of mould formation and discolouration on the free surface. Similar disadvantageous effects can also occur in the overlapping area of the wrapper on a block of margarine.

The risk of mould formation can be avoided by using preservatives. However, most consumers prefer products without preservatives. It is known to insert a sealing sheet between the lid and the margarine, by means of which the undesired discolouration can be reduced to a large extent and the risk of mould formation decreased. However, this increases the manufacturing cost of the package. Moreover, the disposable sealing sheet is ecologically unfavourable; after removal, it is greasy and can, as a result, soil e.g. fingers and table. After the sealing sheet has been removed, the margarine surface looks unappetizing again.

The problem underlying the invention is to provide a package enclosing margarine or a similar spread in which the above-mentioned shortcomings or drawbacks have largely been overcome in an economically acceptable manner.

SUMMARY OF THE INVENTION

In one aspect the present invention solves this problem in that the coating is a closed, substantially pore-free, edible fat layer which does not contain a discontinuous aqueous phase and is generally inperceptible.

In a further aspect the invention comprises a method of packaging a plastified body of W/O dispersion which includes the step of coating at least a portion of the body with a closed, substantially pore-free, edible fat layer which does not contain a discontinuous aqueous phase and is generally imperceptible.

In practice the requirement that the fat layer is not perceptible under conditions of normal use: that is, that the fat layer is not separately perceptible to the average consumer without auxiliary means, is easily met if the coating fat layer has the same colour and opacity as the spread. A preferred method to adjust the opacity is by having a non-aqueous, physiologically acceptable filling agent dispersed in the fat layer. Although inert, solid filling agents may be used it is preferred to use a gas, which is dispersed in an amount of from 8 to 20%.

A certain sealing effect will be noticed using very thin coatings, but in practice acceptable results are obtained with such gas containing layers having a thickness of 3 mm and more. Under normal conditions, no improvement in the sealing effect is noticed with thicknesses in excess of 15 mm. An advantage of the gas containing coatings over the solids containing is the better spreadability. A further advantage is a more acceptable mouth-feel. Suitable gases are nitrogen, inert nitrogen oxides, carbon dioxide and mixtures thereof.

Continuous fat coatings have a sealing effect if their thickness is more than 0.1 mm. To avoid problems due to irregularities on coating, a thickness of from 0.5 to 1 mm is preferred. Although transparent, colourless fat layers can be used, it is preferred that the fat layer has the same colour and opacity as the product, i.e. as the fresh margarine or similar spread.

Using said coating fat layer enables in particular the use of a package/product combination with headspace which looks attractive for a longer period and does not possess the abovementioned drawbacks. This package additionally enables a connection, made by heat-sealing, between container and lid, to achieve a pilferproof closure, an improved seal against entry of oxygen, and increased impermeability to grease.

So that no "fat perception" is experienced on consumption of the coating according to the invention, preferred fat include fats which melt mainly below 37° C. More preferably, the fat should have such a consistency that it cannot flow away at the storage and use temperatures.

BRIEF DESCRIPTION OF THE DRAWING

The package according to the invention can be designed in many different ways. An example of a preferred embodiment is illustrated in the attached FIGURE. This FIGURE schematically shows in cross-section a preferred margarine-containing package according to the invention.

DETAILED DESCRIPTION

According to the FIGURE a conventional tub 1 having a peripheral flange 2 at the upper edge, is filled with margarine 3. Between the surface of the margarine and and the lid 4, which has been attached by sealing (e.g. heat sealing), there is a headspace 5. On the surface of the margarine, preferably introduced in liquid state, there is a fat layer of about 1 mm thickness, which has been applied by spraying. After cooling and solidifying of the fat to the fat layer 6, it has the same consistency as the margarine 3. The material of fat layer 6 is chosen and coloured such that it has about the same colour and opacity as the margarine 3 which has been freshly introduced into the tubs. Obviously the fat layer 6 can be applied to the margarine 3 not only by spraying but also in another manner.

Besides the package illustrated in detail in the form of a tub, the present invention, as is quite obvious, can also be realized with a so-called "wrapper". In this case the coating fat layer should coat the surface of the margarine contained therein or the enclosed other spread at least in the area of the overlapping parts of the wrapper.

In the embodiments as described hereinbefore a gas containing fat layer may be used as a sealing coating instead of the continuous fat layer. In practice this will result in an improved imperceptibility.

Plastic tubs are filled with a standard medium soft margarine Rama R. Before an appreciable crystallisation occurs the upper surfaces of the margarine are coated with gas containing fat, prepared by introducing nitrogen into the same fatblend as used for preparing the margarine before entering the usual votators. No aqueous phase was added.

This fatblend containing 15% dispersed nitrogen is coated in different thicknesses, i.e. 0,5; 3 and 7 mm, onto the free surfaces of the margarine in the tubs.

On storage of such a fat blend-coated margarine at temperatures ranging from 5° to 20° C. the colour of the fat blend remained stable and no oil-exudation was observed. The extent of the abovementioned darkening or discolouration of the spread was markedly reduced and a further advantageous effect, that the margarine did not stick to the lid of a tub-type package, was observed.

The coatings are in practice not noticeable, have about the same spreading properties as the margarine and prevent the margarine from darkening. Best results are obtained with the 7 mm coatings.

Various modifications may be made within the scope of the present invention. For example similar results are obtained if, instead of margarine, a standard commercial low fat spread is used, which is coated with a fat layer preferably consisting of the same fat blend as that used in the spread, also containing the same amount of colouring matter such as carotene, having dispersed therein a suitable gas in an amount of 8 to 20%. Suitable gases include nitrogen, inert nitrogen oxides, carbon dioxide and mixtures thereof.

We claim:

1. A package having walls containing a plastified water-in-oil dispersion, at least a surface of which that is not in contact with the walls of the package, said package comprising a thin coating that is a closed, substantially pore-free, edible fat layer not containing a discontinuous aqueous phase, a greater part of the fat layer having a fat of melting point below 37° C., which layer is generally imperceptible and said layer has a non-aqueous, physiologically acceptable filling agent dispersed therein in an amount of 8 to 20%, said filling agent being a gas selected from the group consisting of nitrogen, inert nitrogen oxides, carbon dioxide and mixtures thereof.

2. A package according to claim 1, wherein the fat layer has the same colour and opacity as the dispersion.

3. A package according to claim 1 or 2, wherein the package is a tub-shaped container closed by means of a lid covering a headspace.

4. A package according to claim 3, wherein the lid has been connected to the container by heat-sealing.

5. A package according to claim 1 or 2, wherein the package is a wrapper having overlapping parts, the dispersion is a margarine, and the coating fat layer covers the surface of the margarine at least in an area of the overlapping parts of the wrapper.

6. A package according to claim 1, wherein the fat layer is continuous and has a thickness of 0.5 to 1 mm.

* * * * *